United States Patent
Simon (10) Patent No.: US 8,983,901 B1
(45) Date of Patent: Mar. 17, 2015

(54) SYSTEM AND METHOD FOR RECTANGULAR REGION COVERING

(71) Applicant: Google Inc., Mountain View, CA (US)

(72) Inventor: Benjamin Wolfe Simon, New York, NY (US)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 13/759,313

(22) Filed: Feb. 5, 2013

(51) Int. Cl.
   *G06F 17/30* (2006.01)
(52) U.S. Cl.
   CPC .............................. *G06F 17/30168* (2013.01)
   USPC ............................ 707/608; 715/212; 715/751
(58) Field of Classification Search
   USPC ........................................................ 707/608
   See application file for complete search history.

(56) References Cited

U.S. PATENT DOCUMENTS

| | | | | |
|---|---|---|---|---|
| 6,006,239 A | * | 12/1999 | Bhansali et al. | 1/1 |
| 7,146,561 B2 | * | 12/2006 | Bauchot et al. | 715/212 |
| 2003/0226105 A1 | * | 12/2003 | Waldau | 715/503 |
| 2009/0112937 A1 | * | 4/2009 | Campbell et al. | 707/201 |
| 2010/0174678 A1 | * | 7/2010 | Massand | 707/610 |

\* cited by examiner

*Primary Examiner* — Rehana Perveen
*Assistant Examiner* — Robert F May
(74) *Attorney, Agent, or Firm* — Ropes & Gray LLP (57) ABSTRACT

Systems and methods are provided for determining mutation regions for a spreadsheet. Mutation regions are iteratively assigned to a first region of cells in the spreadsheet. To assign a mutation region, a column is selected from the first region. A first row in the first region of cells is associated with the selected column that is not assigned to a mutation region and that is not included in a second region of the spreadsheet is determined. A largest region contained within the first region that does not overlap with the second region for which the cell in the selected column and the first row is in a designated position is determined. The largest region is assigned as a mutation region for the spreadsheet.

20 Claims, 8 Drawing Sheets

|   | A | B | C | D | E |
|---|---|---|---|---|---|
| 1 |   |   |   |   |   |
| 2 |   |   |   |   |   |
| 3 |   |   |   |   |   |
| 4 |   |   |   |   |   |
| 5 |   |   |   |   |   |
| 6 |   |   |   |   |   |
| 7 |   |   |   |   |   |
| 8 |   |   |   |   |   |
| 9 |   |   |   |   |   |
| 10 |   |   |   |   |   |
| 11 |   |   |   |   |   |
| 12 |   |   |   |   |   |
| 13 |   |   |   |   |   |
| 14 |   |   |   |   |   |

| A | Set A2 = 2 |
|---|---|
| B | Set A3 = 4 |
| C | Set B3 = A2+A3 |
| D | Set C10 = A2 x A3 |
| E | Set E9 = B3 + C10 |
| F | Set D1 = 3 |
| G | Set D12 = 7 |
| H | Set A3 = 5 |
| I | Delete Row 6 |
| J | Add Row 11 |
| K | Set E4 = 9 |
| L | Delete D12 |

| A | [3:3, 2:3] |
| B | [2:3, 4:4] |
| C | [3:5, 5:5] |
| D | [2:5, 2:5] |
| $D_1$ | [3:3, 2:3] |
| $D_2$ | [2:3, 4:4] |
| $D_3$ | [3:5, 5:5] |
| $D_4$ | [2:2, 2:3] |
| $D_5$ | [2:2, 5:5] |
| $D_6$ | [4:5, 2:4] |

SYSTEM AND METHOD FOR RECTANGULAR REGION COVERING

FIELD

This disclosure relates generally to techniques for resolving conflicts that arise among edit commands entered by different users in a collaborative spreadsheet environment.

BACKGROUND

Conflicting edits of a spreadsheet may be received when the spreadsheet is accessed by multiple collaborators. For example, a first user may select to perform an edit to a first region of cells of the spreadsheet and a second user may perform an edit to a second region of cells of the spreadsheet overlapping the first region. In order for all collaborators to have a common (i.e., consistent) spreadsheet, such conflicts should be resolved.

SUMMARY

Mutations representing spreadsheet edit operations are received at a server from multiple collaborators. Operational transforms are used to modify mutations that overlap ("conflict") in common regions of the spreadsheet. These operational transforms may result in irregular (e.g., non-rectangular) areas of the spreadsheet over which a given type of mutation is to be applied. Accordingly, disclosed herein are techniques for efficiently representing mutations over irregular areas of a spreadsheet.

Accordingly, disclosed herein is a computing system configured to determine mutation regions for a spreadsheet. The computing system comprises a network interface configured to receive a first user command comprising a modification to a first region of cells in the spreadsheet and receive a second user command comprising a modification to a second region of cells in the spreadsheet, the second region at least partially overlapping with the first region. The computing system also comprises a processor for iteratively assigning mutation regions to the first region of cells in the spreadsheet. The processor is configured to select a column from the first region of cells in the spreadsheet, determine a first row in the first region of cells associated with the selected column that is not assigned to a mutation region and that is not included the second region, determine a largest region contained within the first region that does not overlap with the second region for which the cell in the selected column and the first row is in a designated position, and assign the determined largest region as a mutation region for the spreadsheet.

Also disclosed herein are methods for determining mutation regions for a spreadsheet. A first user command is received comprising a modification to a first region of cells in the spreadsheet, a second user command is received comprising a modification to a second region of cells in the spreadsheet. The second region at least partially overlaps with the first region. Mutation regions are iteratively assigned to the first region of cells in the spreadsheet by selecting a column from the first region of cells in the spreadsheet, determining a first row in the first region of cells associated with the selected column that is not assigned to a mutation region and that is not included the second region, determining a largest region contained within the first region that does not overlap with the second region for which the cell in the selected column and the first row is in a designated position, and assigning the determined largest region as a mutation region for the spreadsheet.

BRIEF DESCRIPTION OF THE DRAWINGS

Further features of the disclosed techniques, their nature and various advantages, will be apparent upon consideration of the following detailed description, taken in conjunction with the accompanying drawings, in which like reference characters refer to like parts throughout, and in which.

DETAILED DESCRIPTION

Described herein are systems and methods for reducing a number of rectangular sub-regions needed to represent a mutation over an irregular (e.g., non-rectangular) area of a spreadsheet, thereby reducing a computational complexity and increasing a responsiveness of a spreadsheet program. In an illustrative implementation, a server located in a cloud storage system delivers a spreadsheet to multiple remote client users, who enter edits of the spreadsheet. These edits are represented by mutations that are stored in a pending queue on the client computer and that are sent in batches from the client computer to the server. The pending queue includes a sent section for mutations that have been sent to the cloud storage system and an unsent section for mutations that have not been sent to the cloud storage system.

A global mutation log stored on the server records mutations to the spreadsheet made by users. When a user on a client computer requests the spreadsheet from the server, the server applies the mutations stored in the global mutation log to the spreadsheet and sends the spreadsheet, or a portion of the spreadsheet (referred to as a "chunk" of the spreadsheet), to the client computer. Mutations made by collaborators of a given user are also sent to the user's client computer and placed in a collaborator queue.

Figure 1:
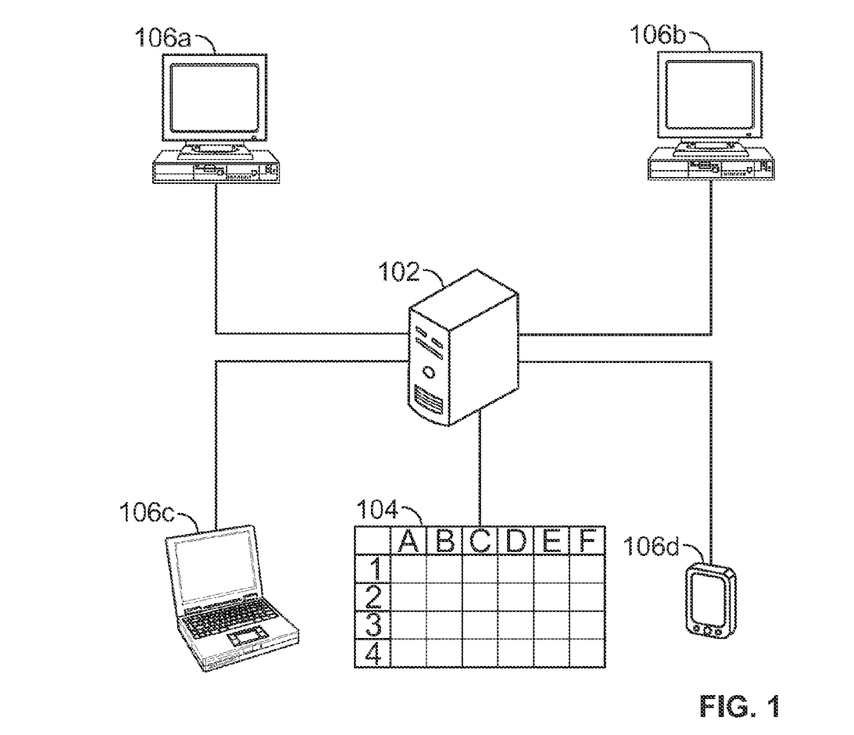
FIG. 1 depicts a client-server system, where the server supports a cloud storage system for storing spreadsheets and other files in accordance with an implementation.

These features may be implemented using a system as shown in FIG. 1. In particular, FIG. 1 illustrates a client-server system, where the server supports a cloud storage system for storing spreadsheets and other files in accordance with an implementation. System 100 includes one or more servers 102 which collectively provide a cloud storage system for storing files such as spreadsheet file 104. System 100 also includes a number of client computers 106a through 106d which connect to servers 102 through a remote network, such as the Internet. Each one of client computers 106a through 106d may be a desktop computer, laptop computer, mobile device, tablet, or any other computing device capable of connecting with servers 102. The remote network connection may be a wired or wireless Internet connection, local area network (LAN), wide area network (WAN), Wi-Fi network, Ethernet, or any other type of known connection. As would be understood by one of ordinary skill, based on the disclosure and teachings herein, a server or system as used in this description may be a single computing device or multiple computing devices working collectively and in which the storage of data and the execution of functions are spread out among the various computing devices.

Figure 2:
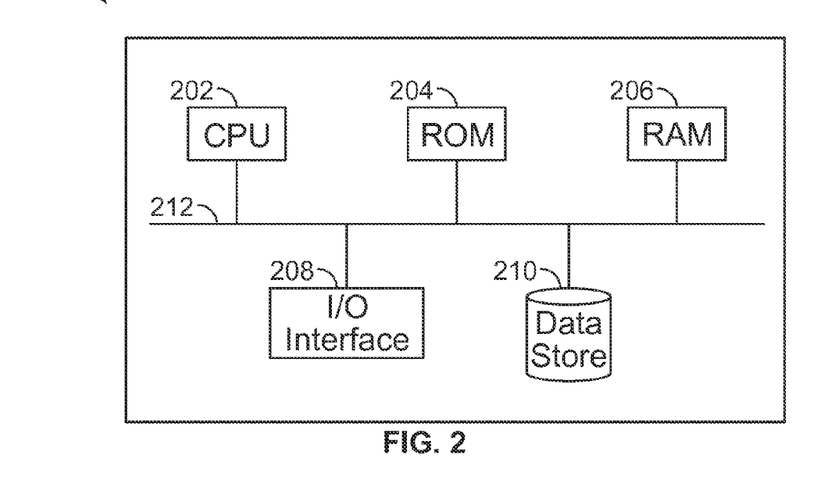
FIG. 2 depicts an exemplary client computer in accordance with an implementation.

FIG. 2 depicts an exemplary client computer in accordance with an implementation. The client computer 200 includes a central processing unit (CPU) 202, read only memory (ROM) 204, random access memory (RAM) 206, input/output interface 208, data store 210, and bus 212. Client computer 200 may have additional components that are not illustrated in FIG. 2. Bus 212 allows the various components of client computer 200 to communicate with each other. Input/output interface 208 allows client computer 200 to communicate with other devices, such as one or more servers hosting the cloud storage system. Data store 210 may store, among other things, code for a web browser for interacting with a cloud storage system and displaying and editing files stored on the cloud storage system. Data store 210 also stores one or more portions of a spreadsheet loaded from the cloud storage system.

Data store 210 for storing files and programs on client computer 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writeable, or re-writeable CD-ROM and DVD-ROM disks.

Figure 3:
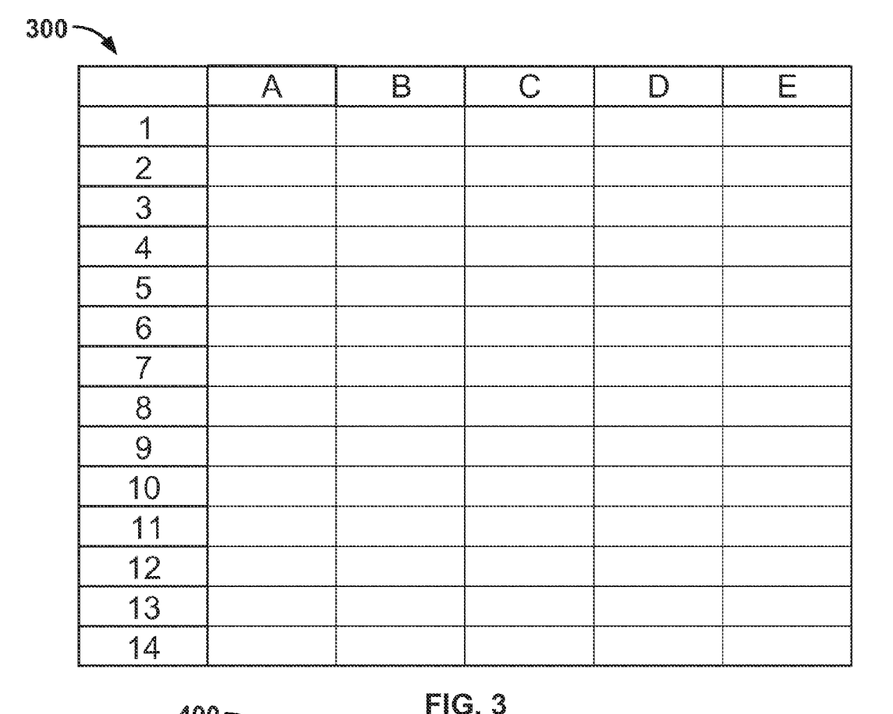
FIG. 3 depicts an illustrative portion of a spreadsheet that may be stored on a cloud storage system in accordance with an implementation.

FIG. 3 depicts an illustrative portion of a spreadsheet that may be stored on a cloud storage system in accordance with an implementation. Spreadsheet 300 includes rows 1 through 14 and columns A through E. The cloud storage system may represent the entire spreadsheet 300 using one or more chunks, where each chunk represents a range of cells in the spreadsheet. A spreadsheet file may include a number of individual sheets, each having its own tab, arranged in a "workbook" structure. Chunks may be created for each sheet within the spreadsheet file.

Figure 4:
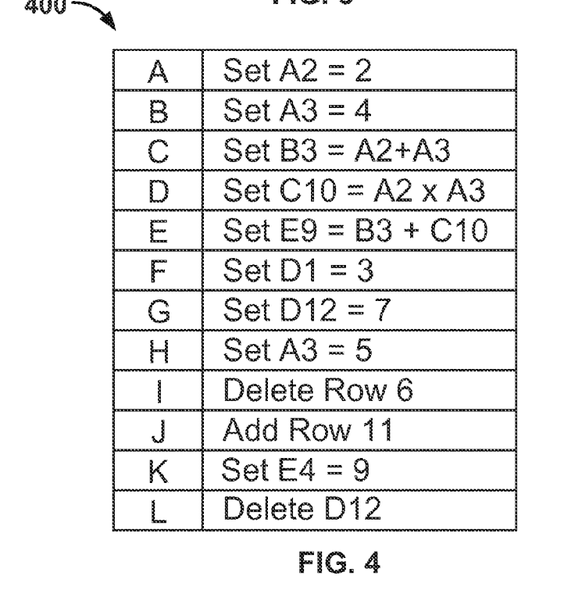
FIG. 4 depicts an illustrative global mutation log in accordance with an implementation.

A global mutation log is associated with the spreadsheet. FIG. 4 depicts an illustrative global mutation log in accordance with an implementation. In particular, the global mutation log 400 applies to all chunks of a spreadsheet, so only one log is stored per spreadsheet. Global mutation log 400 stores mutations, or edits, that all users with write access to the spreadsheet send to the cloud storage system, in the order in which they are received. These edits may be to set the value of cells, delete cell values, enter formulae into cells, cut, copy or paste values, add or delete rows and columns, or any other operation permissible in an electronic spreadsheet. For example, global mutation log 400 stores a number of set value commands, such as "Set A2=2" for mutation A, "Set A3=4" for mutation B, and "Set B3=A2+A3" for mutation C. Global mutation log 400 may also store row addition and deletion mutations, such as "Delete Row 6" for mutation I and "Add Row 11" for mutation J. Other mutations not shown in FIG. 4 may also be stored in global mutation log 400.

In case of conflicting mutations or mutations that occur or are received at the same time, the server executes conflict resolution mechanisms to determine the proper order of mutations. Specifically, operational transforms are used by the server to modify lower-prioritized mutations (e.g., later received mutations) in view of higher-prioritized mutations, and the server applies the (potentially modified) mutations to the spreadsheet in the order specified by the global mutation log.

Figure 5:
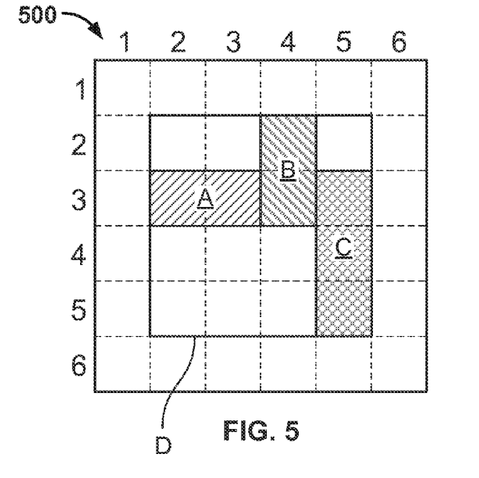
FIG. 5 depicts an illustrative region of a spreadsheet for which several mutations have been received from one or more client computers in accordance with an implementation.
Figure 6:
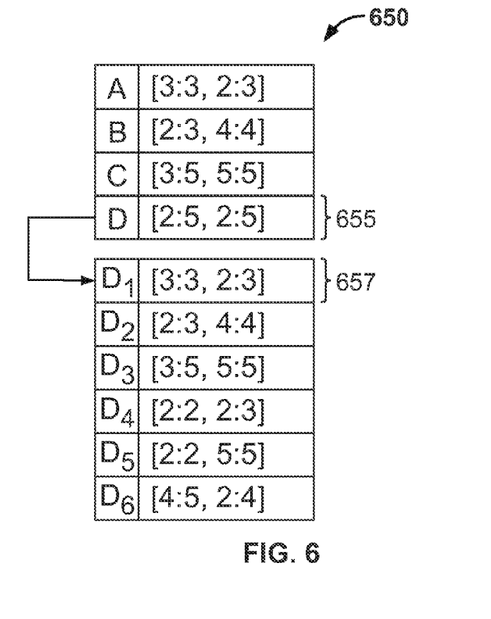
FIG. 6 depicts a global mutation log corresponding to the region of the spreadsheet depicted in FIG. 5 in accordance with the implementation of FIG. 5.

FIG. 5 depicts an illustrative region of a spreadsheet for which several mutations have been received from one or more client computers in accordance with an implementation. In particular, each mutation corresponds to a spreadsheet edit operation received at a server from a client computer. Further, FIG. 6 depicts a global mutation log corresponding to the region of the spreadsheet depicted in FIG. 5 in accordance with the implementation of FIG. 5. In particular, the global mutation log 650 of FIG. 6 depicts, in prioritized order, mutation A affecting cells [3:3, 2:3] of spreadsheet 500, mutation B affecting cells [2:3, 4:4] of the spreadsheet 500, mutation C affecting cells [3:5, 5:5] of the spreadsheet 500, and mutation D affecting cells [2:5, 2:5] of the spreadsheet 500, where the notation [a:b, c:d] indicates a rectangular region between rows a and b and columns c and d (inclusive). Note that the particular data edit operations associated with each of mutation A, mutation B, mutation C, and mutation D are not necessary for the present discussion and are thus omitted from FIG. 6.

The server applies each of mutations A, B, and C in the prioritized order to the respective cells of the spreadsheet 500. The cells of the mutation D, however, overlap with the cells of mutations A, B, and C. Thus, in applying the mutation D, i.e., mutation 655, to the spreadsheet 500, the server decomposes mutation 655 into several smaller mutations, labeled D1 through D6 in FIG. 6. Specifically, mutation D1 657 applies to cells of mutation D that overlap with cells of mutation A and mutation D1 is obtained by performing an operation transform of the mutation D based on mutation A. Similarly, mutations D2 and D3 are obtained by performing operational transforms of the mutation D as applied to cells that overlap with the mutation area for mutations B and C, respectively.

As seen in the graphical depiction of FIG. 5, performing operational transforms to resolve edit conflicts in the regions of areas of mutations A, B, and C fragments the overall area (i.e., the area [2:5, 2:5]) and leaves a non-rectangular area over which the mutation D is to be applied. In particular, with continued reference to FIG. 5, the operational transforms performed to obtain mutations D1 through D3 leaves the irregular area that is the union of areas [2:2, 2:3], [2:2, 5:5], and [4:5, 2:4] as the remaining area over which the mutation for D is to be applied.

It is desirable to cover this irregular area with as few rectangular regions as possible to reduce computational complexity and increase responsiveness associated with performing mutation operations in a spreadsheet. For the simplified illustrative spreadsheet 500, it is straightforward to determine that a minimum of three rectangular regions are needed to cover the irregular area that is the union of [2:2, 2:3], [2:2, 5:5], and [4:5, 2:4], and these three regions are reflected in the mutations D4 through D6 of FIG. 6. However, actual spreadsheet regions encountered in practice are typically larger and more complex than that of the spreadsheet 500, and techniques are needed to efficiently cover such regions with a small number of rectangles.

Figure 7:
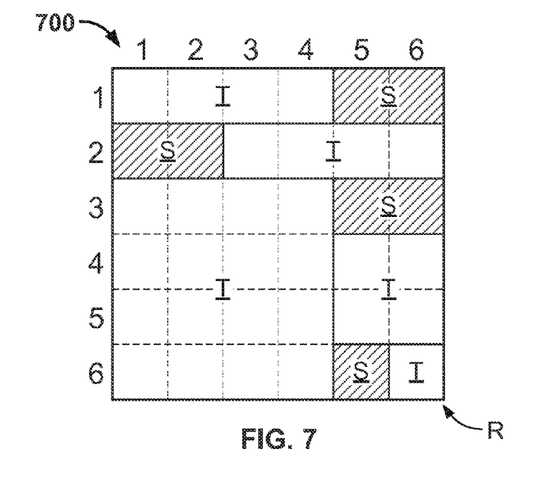
FIG. 7 depicts regions of a spreadsheet related to a rectangular region covering technique in accordance with an implementation.

With reference to FIG. 7, the task of covering an irregular region with a minimized number of rectangular regions may be formulated as follows. Given a rectangular range R (i.e., cells [1:6, 1:6] of the spreadsheet 700) and a set of non-overlapping rectangular subranges S (i.e., corresponding to areas over which localized operational transforms have been performed), produce a set of non-overlapping rectangular subranges T such that none of the subranges in T overlap subranges in S and the union of the subranges of S and T completely covers the range R.

In the formulation above, the range R corresponds to the region of cells over which a lowest priority mutation in a set of mutations is applied and the subranges T correspond to areas overlapping the range R over which higher priority mutations are first applied. The range R is necessarily a rectangular region because spreadsheet edit commands are applied to rectangular regions of one or more cells (as specified by a user). Further, the requirement that the range R be completely covered simply reflects a basic requirement that a data edit operation be applied to every cell specified by a user in requesting an edit of a spreadsheet.

Figure 8:
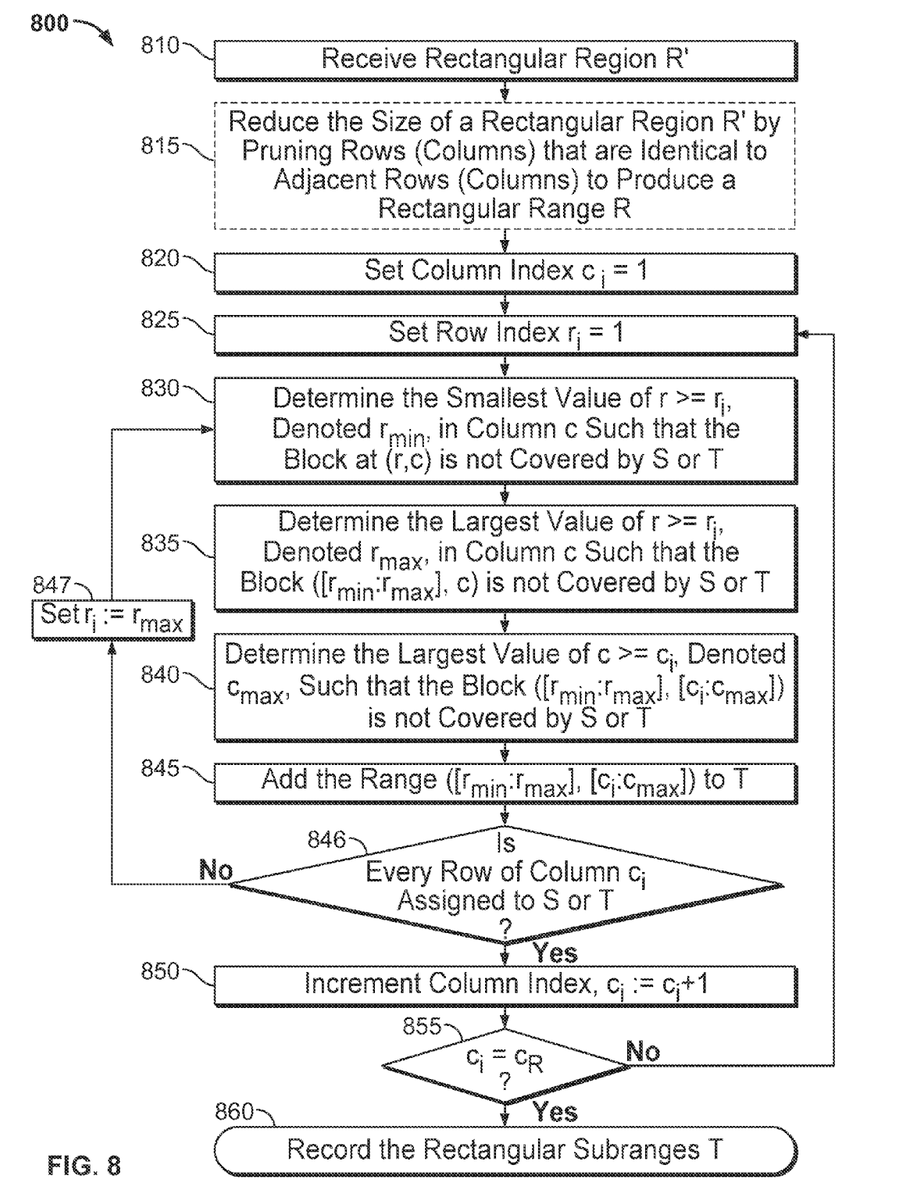
FIG. 8 depicts an illustrative process for determining rectangular regions in a rectangular region covering technique in accordance with an implementation.

FIG. 8 depicts a process for efficiently covering an irregular region with rectangular subranges T in accordance with an embodiment. Process 800 starts at 810, where a rectangular region R' is received. For example, in an illustrative implementation, the received region R' is depicted by region R' 900 in FIG. 9.

Figure 9:
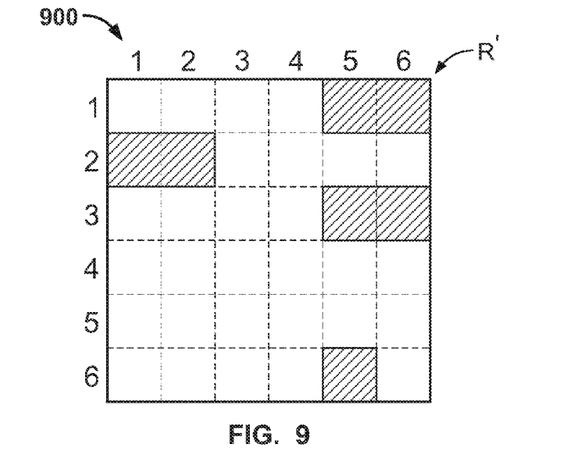
FIGS. 9-15 graphically depict a progression in which rectangular regions are assigned as subranges of T in a rectangular region covering technique in accordance with an implementation.

At 815, the operations of which are optional, the size of the region R' is reduced by pruning (i.e., removing) rows that are "identical" to adjacent rows and columns that are "identical" to adjacent columns within the rectangular region R' to produce a reduced region R (if any such rows or columns exist). The meaning of the term "identical" is explained next. In general, a given column of the region R' may include a number of cells covered by the rectangular subranges S. For example, the first column of the region R' 900 of FIG. 9 is covered by an element of the rectangular subranges S at row 2, but not at rows 1 and 3 through 6.

In general, two columns are said to be "identical" if the exact same set of rows in each column are covered by an element of the rectangular subranges S. For example, in the region R' 900 of FIG. 9, adjacent columns 1 and 2 are identical because each row is covered by the rectangular subranges S at row 2 and not at any other row. Similarly, columns 3 and 4 are identical because each column is uncovered by the rectangular subranges S at every row. Accordingly, because columns 1 and 2 are identical and adjacent, one of these columns is removed from the rectangular region R' at 810 (the choice of which column to remove is arbitrary). Similarly, because columns 3 and 4 are identical and adjacent, one of these columns is removed from the rectangular region R' at 810.

Figure 10:
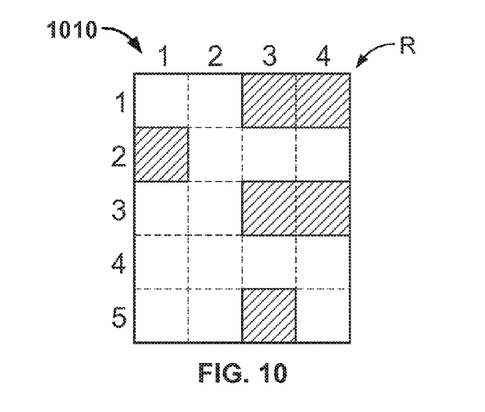
Figure 11:
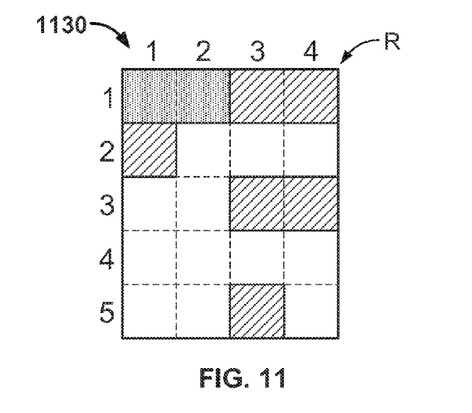

In a similar manner, two rows are said to be identical if the exact same set of columns in each row are covered by the rectangular subranges S. Thus, in the region R' 900 of FIG. 9, rows 4 and 5 are the only identical and adjacent rows (rows 1 and 3, while identical, are not adjacent). To continue with the example, the region R 1010 of FIG. 10 is obtained at 815 after removing all identical rows and columns from the region R' 900 of FIG. 9.

Although not apparent from the example above, if more than two identical rows are present in a region R' then exactly one row is retained in the region R. Similarly, if more than two identical columns are present in a region R' then exactly one column is retained in the region R. Further, as the operations at 815 are optional, they are omitted in certain implementations by setting the region R' equal to the region R.

It is noted that rows and columns "removed" at 815 are not actually discarded from the corresponding spreadsheet. Rather, these rows and columns are "removed" only in the sense of being omitted in most of the calculations and operations performed by the process 800 and solely for determining the rectangular subranges T using a reduced number of computations. The rows and columns "removed" at 815 are actually maintained in the spreadsheet and accounted for at 860, as described below.

At 820 and 825, a column index $c_i$ and row index $r_i$, respectively, are set equal to a value of 1. At 830, the smallest row index value r, such that $r \geq r_i$, and for which the block of cells located at [r:r, $c_i$:$c_i$] is not covered by subranges S or any current assigned subrange in T is determined. This value of r is denoted $r_{min}$. For example, in FIG. 10, $r_{min}$=1 when $c_i$=1. At 835, the largest row index value r, such that $r \geq r_i$, is determined so that the block of cells located at [$r_{min}$:r, $c_i$:$c_i$] is not covered by subranges S or T. This value of r is denoted $r_{max}$. In FIG. 10 $r_{max}$=1 when $r_{min}$=1 and $c_i$=1.

At 840, the largest column index value c, such that $c \geq c_i$, is determined so that the block of cells [$r_{min}$:$r_{max}$, $c_i$:$c_{max}$] is not covered by subranges S or T. This value of c is denoted $c_{max}$. For example, in FIG. 10, $c_{max}$=2 when $r_{min}$=1. At 845, the block of cells [$r_{min}$:$r_{max}$, $c_i$:$c_{max}$] is added to the subranges T. Thus, in FIG. 10, the block of cells [1:1, 1:2] is added to the subranges T at 845.

At 846, it is determined if every row in column $c_i$ is assigned to subranges S or T. If so, the process 800 proceeds to 850. If, on the other hand, every row in column $c_i$ is not yet assigned to one of subranges S or T, then the process 800 proceeds to 847, where $r_i$ is assigned to the value $r_{max}$, and the process 800 then returns to 830.

At 850, the column index $c_i$ value is incremented by 1. At 855, the column index $c_i$ is compared to the number of columns present in the received region R, denoted by $c_R$. For example, there are four columns in region R 1010 of FIG. 10, and so $c_R$=4.

If the column index $c_i$ is equal to the value $c_R$, then the process 800 proceeds to 860, where the subranges T is recorded. In certain implementations, recording the subranges T includes storing data representing the subranges T (in short- or long-term memory). In certain implementations, recording the subranges T includes providing data representing the subranges T to another process (which is not illustrated in FIG. 8). If, on the other hand, the column index $c_i$ is not equal to the value $c_R$, then the process 800 returns to 825.

In recording the subranges T at 860, any rows or columns otherwise removed at 815 are accounted for. As an example, suppose the subrange [1:2, 1:2] was assigned to the subranges T during an iteration of 845. Suppose further, that a second row of the rectangular region R was the only row or column removed from the from the rectangular region R' at 810. Accounting for this removed row, a subrange of [1:3, 1:2] would be recorded at 860, rather than the subrange [1:2, 1:2] because the subrange of [1:3, 1:2] reflects the (temporary) removal of the second row simply for computational purposes by the process 800.

FIGS. 9-15 graphically depict a progression in which rectangular regions are assigned as subranges of T in a rectangular region covering technique in accordance with an implementation. In particular, FIGS. 9-15 together illustrate an application of the process 800 to determine subranges T for the region R' 900 of FIG. 9. As will be described in more detail below, cells shaded with diagonal hatching FIGS. 9-15 denote cells covered by the subranges S and fully shaded cells in FIGS. 9-15 denote cells assigned to the subranges T. As will be explained next, the subranges [1:1,1:4], [3:6,1:4], [2:2,3:6], [4:5,5:6], and [6:6,6:6] are added, in that sequence, to the subranges T. Thus, in this example, there are five total subranges used to cover T.

Before formalizing application of the process 800 to the region R' 900 of FIG. 9, an intuitive explanation of the process is provided. First, removing identical rows and columns, the columns two and four and row four of the region R' 900 of FIG. 9 are removed to produce the region R 1010 of FIG. 10. Next, focusing on the first column of the region R, rows are checked one-by-one in ascending order (i.e., starting with row one) until a cell is identified in the first column that does not (yet) belong to either subranges S or subranges T. Referring to FIG. 10, the first cell in the first column, cell [1:1,1:1], is so identified. Next, any additional adjacent cells directly below the identified cell that are not included in S or T are added to the identified cell. In the case of FIG. 10, there are no such additional rows, as the second row includes a cell at [2:2, 1:1] assigned to the subranges S. Next, cells to the right of the identified cells are added until a region in S is encountered. In the case of FIG. 10, a region in S is encountered is encountered in the first row and third column. Thus, the first determined subrange is [1:1, 1:2] when specified in terms of the region R. Thus, this subrange is fully shaded, denoting that it has been assigned to the subranges T, in FIG. 11. In terms of the region R', however, and taking into account that columns two and four and row four were removed from the region R' to produce the region R, the first recorded subrange of T is [1:1,1:4].

Figure 12:
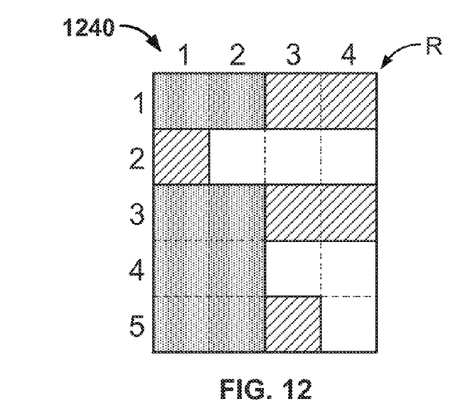
Figure 13:
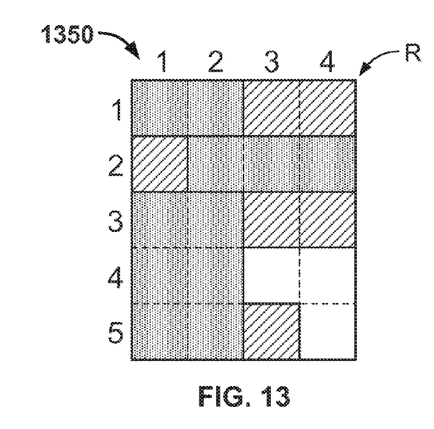
Figure 14:
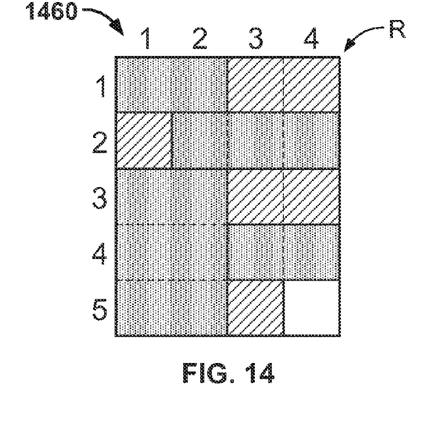
Figure 15:
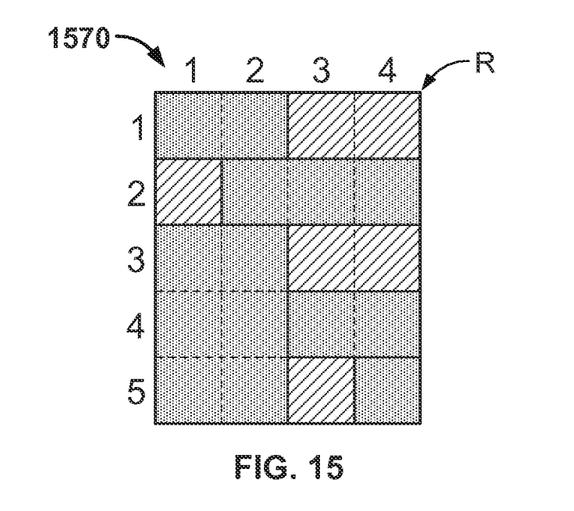

To find the next subrange to be included in T, depicted in FIG. 12, the lowest numbered cell in the first column of the region R not assigned to S or T is determined. This is the third cell in the first column. As before, any additional adjacent cells directly below the identified cell that are not assigned to either the subranges S or T are identified and added to the recorded subrange. In this case, cells at [3:5, 1:1] are added. To determine the number of columns that are added, a subregion is created by extending the region [3:5, 1:1] to the right until at least one cell in S is encountered. As depicted by the full shading in FIG. 12, this results in a second determined subrange of [3:5, 1:2]. In terms of the region R', the second recorded subrange of T is [3:6,1:4].

As depicted by the shading in FIG. 12, every cell in the first and second columns of the region R is now assigned to one of the subranges S or T. Thus, the process next moves to the third column of the region R. Repeating the manner of the process described above, the cell at [2:2, 3:3] is identified as the lowest numbered cell in the third column of the region R that is not already assigned to one of subranges S or T, and a subregion is created by extending the cell at [2:2, 3:3] to the right until a cell in S is encountered. Thus, the third recorded subrange for T is [2:2, 2:4]. This subrange is depicted by the shading in FIG. 13. In terms of the region R', the third recorded subrange of T is [2:2,3:6]. Still in the third column of the region R, and moving to cell [4:4, 3:3], the next subrange added to T is determined to be [4:4, 3:4], as depicted by the shading in FIG. 14. In terms of the region R', the fourth recorded subrange of T is [4:5,5:6]. Finally, moving to the fourth column of the region R and repeating the procedure records [5:5, 4:4] as the fifth and final subrange of T, as depicted by the shading in FIG. 15. In terms of the region R', this fifth and final recorded subrange of T is [6:6,6:6].

Figure 16:
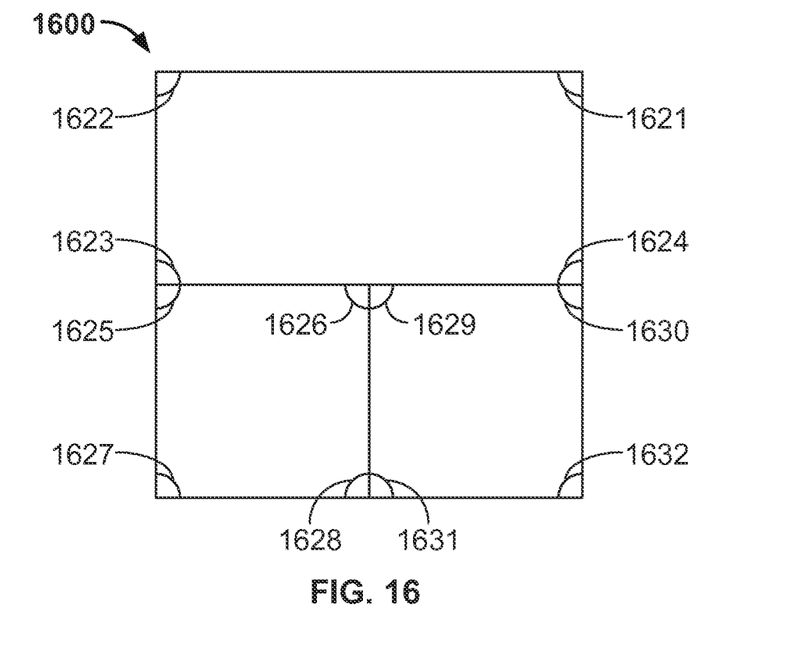
FIGS. 16-19 graphically depict corners associated with various region covering techniques in accordance with an implementation.

The process 800 advantageously reduces a number of rectangular subranges in T needed to cover an irregular region. This feature of the process 800 is explained next. First, define a "corner" of a subregion in R to be an internal angle of the subregion. As an illustrative example, region 1600 of FIG. 16 includes a total of 16 corners, i.e., corners 1621 through 1632. Next, note that the minimizing a total number of subregions in T is equivalent to minimizing the total number of corners present in all of the subregions of T combined. This is because each subregion of T is a rectangle and so contributes exactly four corners to the total number of corners in T.

Figure 17:
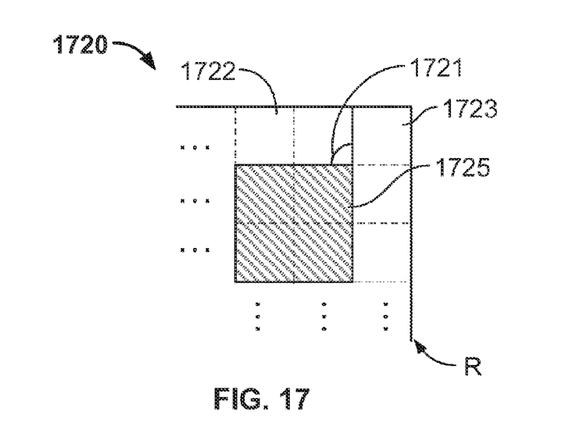

The process 800 reduces a total number of corners present in all of the subranges of T combined. To see this, consider a subspace of S located in the interior of R as depicted, in an illustrative implementation, by subspace 1725, in each of FIGS. 17, 18, and 19. For the purposes of illustration, consider the upper right hand corner of the subspace 1725 (an analysis similar to the current one follows for any other corner of the subspace 1725 and is thus omitted for brevity). There are exactly three methods of covering the region R with subspaces with respect to the upper right hand corner of the subspace 1725. In particular, either two subspaces will be added to T, as depicted in FIG. 17 (where T includes subspaces 1722 and 1723) and FIG. 18 (where T includes subspaces 1846 and 1847), or three subspaces will be added to T, as depicted in FIG. 19 (where T includes subspaces 1951, 1952, and 1953). In particular, the solutions of FIGS. 17 and 18 result in one additional corner immediately adjacent to the upper right hand corner of the subspace 1725 (corner 1721 of FIG. 17 and corner 1841 of FIG. 18), respectively, while the solution of FIG. 19 results in three additional corners (corners 1942, 1943, and 1944 of FIG. 19).

Figure 18:
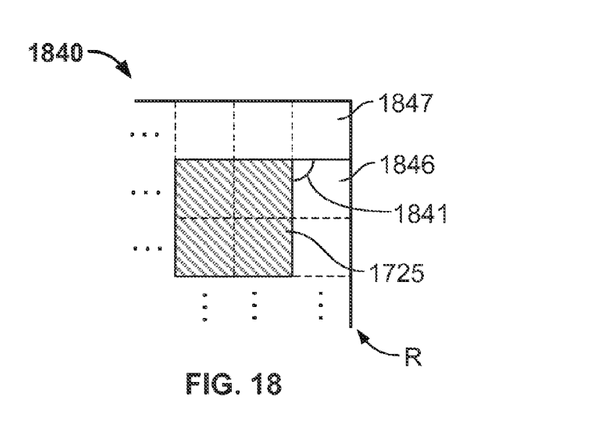
Figure 19:
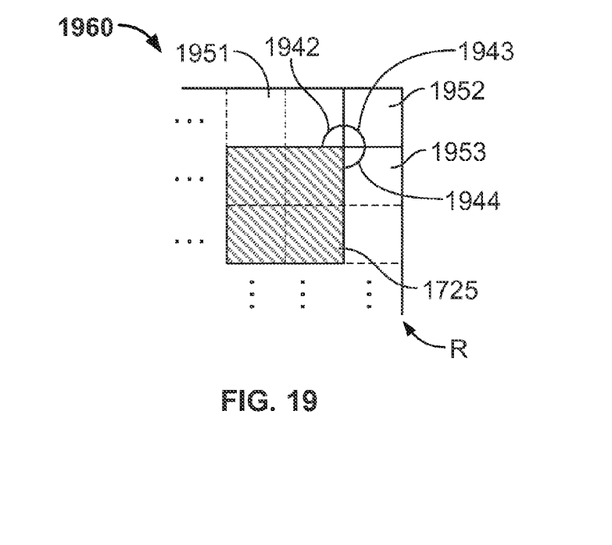

The process 800 produces an assignment of subspaces to T that results in two subspaces being added to T (as depicted in FIGS. 17 and 18) rather than three subspaces being added (as depicted in FIG. 19). Thus, for each corner of each subspace of S located in the interior of R, the process 800 minimizes a total number of corners present in all subspaces of T immediately adjacent to that corner. Further, because the total number of corners in S is fixed, the process 800 reduces a total number of corners present in the subspaces T, and accordingly, reduces a total number of subspaces in T.

It will be understood that the systems and methods described herein may be adapted and modified as is appropriate for the application being addressed and that the systems and methods described herein may be employed in other suitable applications, and that such other additions and modifications will not depart from the scope hereof.

It will be apparent to one of ordinary skill in the art, based on the disclosure and teachings herein, that aspects of the disclosed techniques, as described above, may be implemented in many different forms of software, firmware, and hardware in the implementations illustrated in the figures. The actual software code or specialized control hardware used to implement aspects consistent with the principles of the disclosed techniques are not limiting. Thus, the operation and behavior of the aspects of the disclosed techniques were described without reference to the specific software code—it being understood that one of ordinary skill in the art would be able to design software and control hardware to implement the aspects based on the description herein.

What is claimed is:

1. A computing system configured to determine mutation regions for a spreadsheet, the computing system comprising:
   a network interface configured to:
      receive a first user command comprising a modification to a first region of cells in the spreadsheet; and
      receive a second user command comprising a modification to a second region of cells in the spreadsheet, the second region at least partially overlapping with the first region; and a processor for iteratively assigning mutation regions to the first region of cells in the spreadsheet, the processor configured to:
select a column from the first region of cells in the spreadsheet;
determine a first row in the first region of cells associated with the selected column that is not assigned to a mutation region and that is not included in the second region;
determine a largest region contained within the first region that does not overlap with the second region for which the cell in the selected column and the first row is in a designated position; and
assign the determined largest region as a mutation region for the spreadsheet.

2. The computing system of claim 1, wherein the first region of cells and the second region of cells are each rectangular regions.

3. The computing system of claim 1, wherein the designated position is an upper-left position in the largest region.

4. The computing system of claim 1, wherein the processor is further configured to assign mutation regions only to cells in the first region that are not included in the second region.

5. The computing system of claim 1, wherein the modification of the first user command is selected from the group consisting of an add row command, a delete row command, an add column command, and a delete column command.

6. The computing system of claim 1, wherein cells in the first region that are not included in the second region form a non-rectangular region of cells.

7. The computing system of claim 1, wherein the processor is further configured to determine the first row associated with the selected column to be a lowest-numbered row of the selected column that is not already included in a mutation region and not included in the second region.

8. The computing system of claim 1, wherein the processor is further configured to apply an operational transform to the second user command to produce a modified second user command.

9. The computing system of claim 8, wherein the processor is further configured to apply the second user command to cells in the first region that do not overlap with the second region and apply the modified second user command to cells in the first region that overlap with second region.

10. The computing system of claim 1, wherein the processor is further configured to remove at least one adjacent identical row from the spreadsheet prior to iteratively assigning mutation regions to the first region of cells.

11. A method for determining mutation regions for a spreadsheet, the method comprising:
receiving a first user command comprising a modification to a first region of cells in the spreadsheet;
receiving a second user command comprising a modification to a second region of cells in the spreadsheet, the second region at least partially overlapping with the first region;
iteratively assigning mutation regions to the first region of cells in the spreadsheet by:
selecting a column from the first region of cells in the spreadsheet;
determining a first row in the first region of cells associated with the selected column that is not assigned to a mutation region and that is not included in the second region;
determining a largest region contained within the first region that does not overlap with the second region for which the cell in the selected column and the first row is in a designated position; and
assigning the determined largest region as a mutation region for the spreadsheet.

12. The method of claim 11, wherein the first region of cells and the second region of cells are each rectangular regions.

13. The method of claim 11, wherein the designated position is an upper-left position in the largest region.

14. The method of claim 11, further comprising assigning mutation regions only to cells in the first region that are not included in the second region.

15. The method of claim 11, wherein the modification of the first user command is selected from the group consisting of an add row command, a delete row command, an add column command, and a delete column command.

16. The method of claim 11, wherein cells in the first region that are not included in the second region form a non-rectangular region of cells.

17. The method of claim 11, further comprising determining the first row associated with the selected column to be a lowest-numbered row of the selected column that is not already included in a mutation region and not included in the second region.

18. The method of claim 11, further comprising an operational transform to the second user command to produce a modified second user command.

19. The method of claim 18, further comprising applying the second user command to cells in the first region that do not overlap with the second region and apply the modified second user command to cells in the first region that overlap with second region.

20. The method of claim 11, further comprising removing at least one adjacent identical row from the spreadsheet prior to iteratively assigning mutation regions to the first region of cells.

* * * * *